(12) United States Patent
Haga et al.

(10) Patent No.: US 6,556,215 B1
(45) Date of Patent: Apr. 29, 2003

(54) IMAGE PROCESSING DEVICE AND METHOD THEREOF, GAME DEVICE AND METHOD THEREOF, AND RECORDING MEDIUM RECORDED IMAGE PROCESSING PROGRAM OR GAME PROGRAM OPERATED ON A COMPUTER

(75) Inventors: Norio Haga, Tokyo (JP); Kazunori Ohyama, Tokyo (JP); Kazunobu Satoh, Tokyo (JP); Tetsuya Kaku, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 144 days.

(21) Appl. No.: 09/617,144

(22) Filed: Jul. 14, 2000

(30) Foreign Application Priority Data

Jul. 16, 1999 (JP) .......................................... 11-202776

(51) Int. Cl.⁷ ............................................. G06T 15/00
(52) U.S. Cl. ....................................................... 345/619
(58) Field of Search ................................ 345/422, 427, 345/421, 419, 420, 619, 620

(56) References Cited

U.S. PATENT DOCUMENTS 6,141,015 A * 10/2000 Tanaka ........................ 345/427

* cited by examiner

Primary Examiner—Phu K. Nguyen
(74) Attorney, Agent, or Firm—Finnegan, Henderson, Farabow, Garrett & Dunner, L.L.P.

(57) ABSTRACT

Regarding polygons constituting objects, the purpose of the present invention is to prevent intersection of a polygon with other polygons without increasing the number of polygons, and to display compatible dynamic motions with reality.

The solution is, corresponding vertexes of polygons constituting a first object, memorizing onto a recording means the condition regarding the position corresponding a second object, judging whether the vertexes of polygons constituting such first object satisfy such condition, and amending the position of the vertexes to satisfy the condition if it is judged that the condition is not satisfied. It is possible to display compatible dynamic motions with reality by making a condition that there is no intersection of polygons constituting a first object and polygons constituting a second object.

22 Claims, 14 Drawing Sheets

IMAGE PROCESSING DEVICE AND METHOD THEREOF, GAME DEVICE AND METHOD THEREOF, AND RECORDING MEDIUM RECORDED IMAGE PROCESSING PROGRAM OR GAME PROGRAM OPERATED ON A COMPUTER

BACKGROUND OF THE INVENTION

1. Field of the Invention

The present invention generally relates to image processing technology for controlling the position of polygons, and particularly to a game device for displaying game screens thereby.

2. Description of the Related Art

Regarding a usual game device, a game is developed by operating an input device and controlling movements of objects while watching a screen. Regarding a game device of a 3D (3 dimensional) display, a virtual space is formed in a computer system, wherein objects of the game are arranged. The computer controls the movements of the objects in accordance with the game rules. The computer also develops the game by controlling the object of a main character in accordance with operation by a player. Development of the game is displayed on a monitor screen through a virtual camera arranged in the virtual space.

Each object is usually constituted of a plurality of polygons, and each polygon is constituted of more than 3 vertexes. Each vertex constituting a polygon is normally specified by the coordinates in the virtual space where the polygon is arranged in. Consequently, the motions of the object in a virtual space are finally considered as conversions of the vertex coordinates of the polygon constituting the object.

As objects, a main character, and other characters can be considered as well as shapes of nature, such as geographical features, plants, animals, buildings. Modeling a character can be achieved more realistically by representing a character by a plurality of objects (for example, an object representing a body and an object representing clothes, accessories, or shoes, etc.) rather than by a single object.

At this point, physical mixture of a body, clothes, accessories, and shoes etc. can not principally occur in the real world. Therefore, regarding the objects in the virtual space such as a body and clothes, they need to be arranged physically compatible with each other. FIG. 13 shows an example that object 400 representing a body and object 401 representing a cloth are arranged physically incompatible with each other. In this example, Part 402 of the object representing a body penetrates object 401 representing a cloth.

To prevent such arrangement, it is necessary, on moving an object, to fix coordinates of the next position of the polygons constituting such object, so that there is no intersection with other polygons constituting other polygons.

The following example is a method for fixing coordinates of such next position in order not to cause intersection. In the following description, a body polygon refers to a polygon constituting an object representing a body, and a cloth polygon refers to a polygon constituting an object representing clothes.

The first method is to fix the relation between the positions of 2 kinds of polygons (a body polygon and a cloth polygon). In this method, once a position of one polygon is decided, the position of the other polygon is also decided, therefore, there is no intersection of the 2 polygons no matter where the objects move to.

The second method is, in the event that such motion of objects cause intersections, to amend the vertex coordinates of one polygon so that there will be no intersection. FIG. 14 shows a concept representation to describe the second method. FIG. 14(*a*) shows the vertex coordinates before and (*b*) shows the vertex coordinates after amendment. 400 is an object representing a body and 401 is an object representing clothes.

This method is premised on calculating the vertex coordinates after the independent motions of each of the 2 kinds of polygons, without fixing the relation between. Therefore, as a result of independent calculation of each polygon, and as shown in FIG. 14, if the vertex 403 after movement of the cloth polygon is placed inside object 400 representing a body, there is a possibility of intersection 404 of the 2 kinds of polygons. In such case, if the second method is applied, the coordinates of vertex 403 are amended to be outside of object 400 representing a body. Thereby, the 2 kinds of polygons can be amended not to intersect as shown in FIG. 14(*b*).

However, the above usual methods generate the following problems.

Firstly, the first method has a problem that dynamic and realistic movements cannot be achieved for the relation of the 2 kinds of polygons is always fixed.

For a game of 3D display, the main factor of its attraction depends on how real the real world can be simulated. For a real simulation, for example, it is necessary to dynamically show in the virtual space the phenomenon in the real world such as "when a character runs, its clothes flutter backward because of the wind."

In the first method, however, the 2 kinds of polygons are permitted the same movement for a cloth polygon is fixedly arranged against a body polygon. This only gives an impression that the clothes are as hard as an armor, and so it is impossible to implement dynamic and realistic movements regarding the clothes. Therefore, the content of the display of the game is very unattractive.

The second method has a problem that it cannot perfectly prevent the intersection of the 2 kinds of polygons.

Compared to the first method, the second method surely implements the dynamic and real movements as it permits independent movements respectively to a cloth polygon and a body polygon.

However, although the vertexes of a cloth polygon are amended and placed outside an object representing a body, there is still a possibility of intersection. For example, as shown in FIG. 15, all the vertexes of the cloth polygon are placed outside the object representing a body, but there is intersection 404 of the 2 kinds of polygon. In this situation, a part of the body penetrates the clothes. This is a physically incompatible and unnatural situation. Therefore, it gives incompatibility to the content of the display of the game.

At this point, it is possible to lessen the possibility of intersections by increasing the number of cloth polygon (i.e. the number of vertexes). However, increasing the number of polygon is not desirable because it results in an increase of the processing amount of the coordinate calculation. Furthermore, even if the number of polygon is increased, it is still difficult to completely prevent the occurrence of intersections.

SUMMARY OF THE INVENTION

The object of the present invention, with regard to polygons constituting an object, is not to increase its number but provide image processing technology which permits the prevention of intersections of such polygons with other polygons of other objects.

Another purpose of the present invention is to represent dynamic and realistic movements with no incompatibility.

The image processing method of the present invention is characterized in that it is an image processing method for, corresponding the vertexes of the polygons constituting a first object, recording a positioning condition regarding a position corresponding a second object on a recording means, judging whether the vertexes constituting such first object satisfy the previous condition, and, if judged not, amending the positions of such vertexes to satisfy the condition; that the polygons constituting such first object and the polygons constituting such second object do not intersect.

The game method of the present invention is a game method for arranging objects in a virtual space formed in a computer system, developing a game while controlling the movements of such objects in accordance with the input manipulation and regulated rules, and displaying the situation inside such virtual space as an image through a virtual camera, and is characterized in that the coordinates of the polygon constituting such object are amended by the image processing method of the present invention.

The image compressing method and the game method according to the present invention can be implemented by a computer. The computer program for such purpose can be or loaded to the computer through various media such as CD-ROM, magnetic discs, semiconductor memory and communication network.

The image processing device is comprising a positioning condition memorizing means for, corresponding the vertexes of the polygon constituting the first object, memorizing a condition regarding the position corresponding the second object, and a polygon position amending means for, referring to such positioning condition memorizing means, judging whether the vertexes of the polygon constituting such first object satisfy such condition, and, if it judges that the condition is not satisfied, for amending the positions of such vertexes, and is characterized in that such condition is that the polygons constituting such first object and the polygons constituting such second object do not intersect.

The game device according to the present invention is a game device for arranging objects in a virtual space formed in a computer system, developing a game while controlling the movements of such objects in accordance with input operation and regulated rules, and displaying the situation inside such virtual space as an image through a virtual camera, and is characterized in that it is comprising a image processing device according to the present invention.

Regarding such positioning condition memorizing means, it is desired to memorize, as such condition, the area established relative to such second object, particularly a plane area.

Among 4 plane areas divided by 2 straight lines which are extensions of 2 arbitrary adjacent sides of a polygon circumscribing the circumcircle which is circumscribing the second object on the plane, it is desired that such area is contained in a plane area facing another plane area containing such circumcircle, and it is also desired that such area is a circular area contacting such 2 straight lines.

It is desired that such positioning condition memorizing device records, as such area, at least a circular area, contacting from the opposite side of such circumcircle of 2 straight lines which are extensions of 2 arbitrary adjacent sides of a plane polygon circumscribing the circumcircle which is circumscribing the second object on the plane. It is also desired to record a circular area contacting, from the opposite side of such circumcircle, the extended straight line of one optional side of such polygon.

It is desired that such polygon position amending means judges whether the vertexes of the polygon constituting such first object are included in such area, and, if judges not, amends the positions of the vertexes to be included in such area.

It is desired that such first object is arranged to cover at least a part of such second object, and particularly that such first object is an object representing a material a person is wearing and such second object is an object representing a human body of a material the person is wearing.

EMBODIMENTS

First Embodiment

Figure 1:
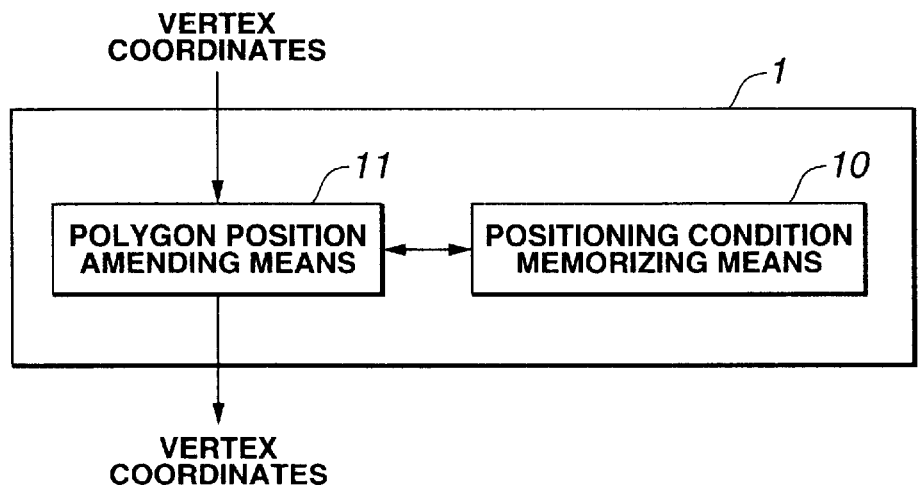
FIG. 1 is a block diagram showing the constitution of the first embodiment.

First embodiment according to the present invention will be hereinafter explained by referring to FIG. 1. The first embodiment according to the present invention, i.e. the image processing device 1 is constituted including positioning condition memorizing means 10 and polygon position amending means 11.

The positioning condition memorizing means 10 memorizes the conditions, corresponding to vertexes of a polygon constituting a fixed object arranged in a virtual space, regarding the positions corresponding the object established not to physically intersect with such corresponding object. The relation between a judging object and an exclusive object is relative. Selection of a judging object from 2 objects depends on its design.

A judging object can be plural. When there is a plurality of a judging object, an exclusive object is established for every judging object. Furthermore, a plurality of exclusive objects can be established for one judging object.

All objects arranged in the virtual space can be the objects of a judging object. Particularly regarding those objects that are moved by a player's operation or a computer's control, they are desired to be judging objects due to a possibility of intersection of polygons caused by such movements.

All objects having a possibility of intersection with judging objects can be objects of an exclusive object.

The condition regarding a relative position corresponding to an exclusive object can be described, for example, by an equality or inequality of the vertex coordinates of the polygons constituting a judging object (hereinafter referred to as a "judging polygon") on the coordinate system where its original is set inside the exclusive object. Such condition is decided such that a judging polygon and an exclusive polygon do not intersect.

Polygon position amending means 11 judges whether such vertex coordinates satisfy such corresponding condition by inputting the vertex coordinates of a judging polygon and referring to the positioning condition memorizing device 10. If the input vertex coordinates of a judging polygon is not the coordinate value on the coordinates where its original is set inside the exclusive object, polygon position amending means 11 judges such condition after conversing the coordinates. For example, if the vertex coordinates is the coordinate value on the coordinates where its original is set inside the judging object, such vertex coordinates should be converted to an absolute coordinate system and then to a coordinate system where its original is set inside the exclusive object.

Polygon position amending means 11, when it judges that such condition is not satisfied, it outputs vertex coordinates for such vertexes without amendment. If it judges that the condition is not satisfied, it amends the positions of the vertexes to satisfy such condition (i.e. not to have a judging polygon and an exclusive polygon intersect), and it outputs the vertexes coordinates after amendment. In this way, occurrences of intersection can be completely prevented by judging the condition that no intersection occurs in the present position of the vertexes.

First Example of First Embodiment

The first example of the first embodiment will be hereinafter explained. In the present example, a judging object is regarded as an object which is permitted transformation and an exclusive object is regarded as a form-fixed object which is permitted no transformation. Selection of a judging object from 2 objects depends on its design, however, it is desired to decide that an object which is permitted transformation is a judging object.

As such objects, for example, a judging object can be an object representing a part of a trouser and an exclusive object can be an object representing a part of a leg. This is because, in the real world, a trouser transforms freely but a leg does not. Therefore, the objects representing clothes such as trousers are modeled as the high flexible forms, and the objects representing a body are modeled as fixed forms.

Figure 2:
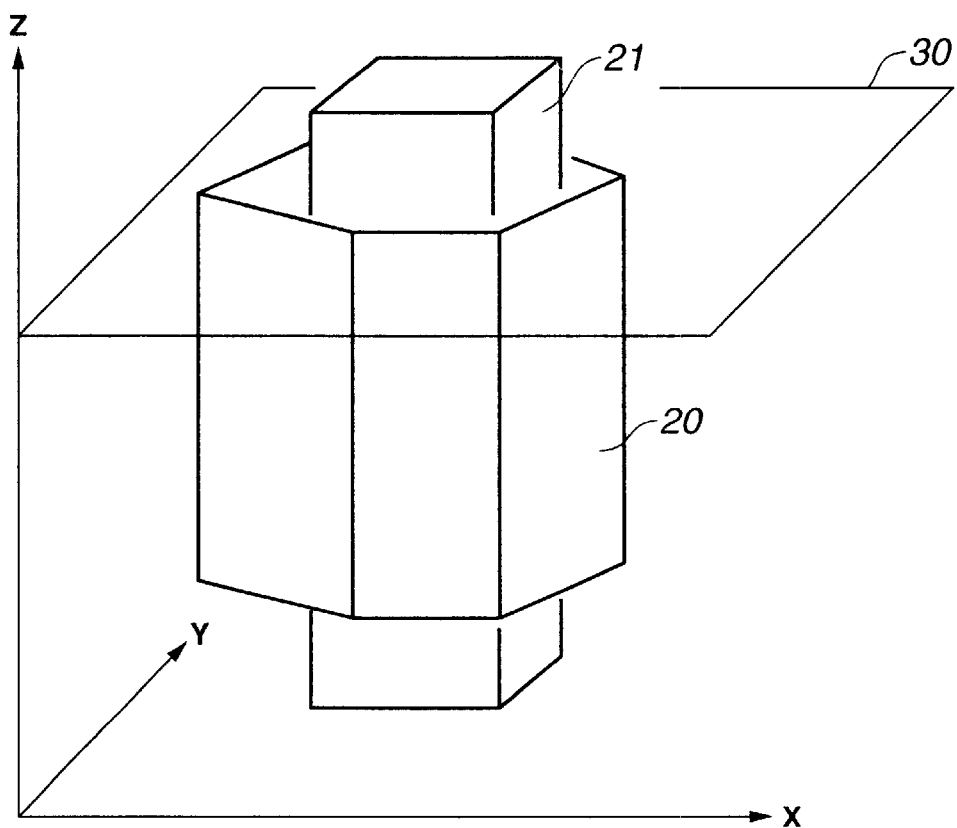
FIG. 2 is a perspective view showing an example of a judging object and an exclusive object.

FIG. 2 shows an example of a judging object and an exclusive object. In this example, there is one judging object and one exclusive object each in order to simplify the explanation.

Judging object 20 representing a part of a trouser has a cylindrical form with the hexagonal upper and bottom sides. The relations among the vertexes of the judging polygon are not fixed and the hexagons are transformable. Furthermore, in this example, the upper and bottom sides are hexagonal, however, the number of angles can be fixed according to the design. Judging object 20 is cylindrical in this example but it can have other forms in such case as, for example, modeling clothes which is made of a sheet of cloth such as a mantle.

Exclusive object 21 representing a part of a leg has a cylindrical form with square upper and bottom sides. Its form is fixed, i.e. the relations of the vertexes of the exclusive polygon are fixed and so the square forms do not transform. Furthermore, the upper and bottom sides are square in this example, however, the angles can be fixed according to the design.

Figure 3:
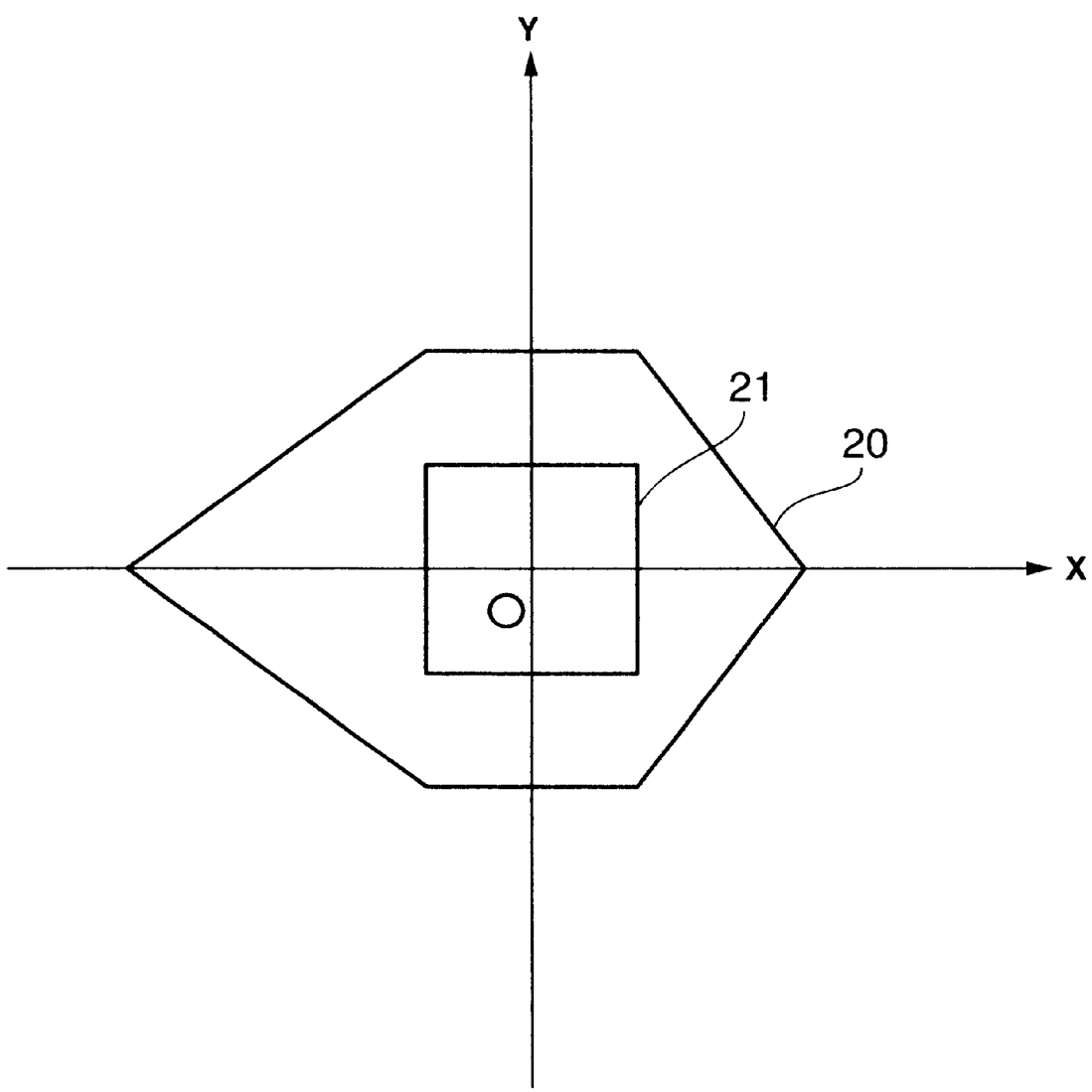
FIG. 3 is a cross section showing an example of a judging object and an exclusive object.

FIG. 3 shows the section of judging object 20 and exclusive object 21, cut by XY cutting plane 30 including the vertexes of the judging polygon, on the coordinate system on which the center of the exclusive object 21 is at its original. Because the exclusive object is a fixed form, the position and the form of the exclusive object on such coordinate system do not depend on the Z coordinates.

Positioning condition memorizing means 10 memorizes an area for every judging polygon on such coordinate system (hereinafter referred to as the "movable area") as the condition regarding the position corresponding to the exclusive object 21.

A movable area is established such that a judging polygon and an exclusive polygon do not intersect. In short, as long as the vertexes of the judging polygon are located inside the movable area, no intersection with the exclusive polygon will occur no matter how the judging polygon moves. The method for deciding such movable area is hereinafter explained.

Figure 4A:
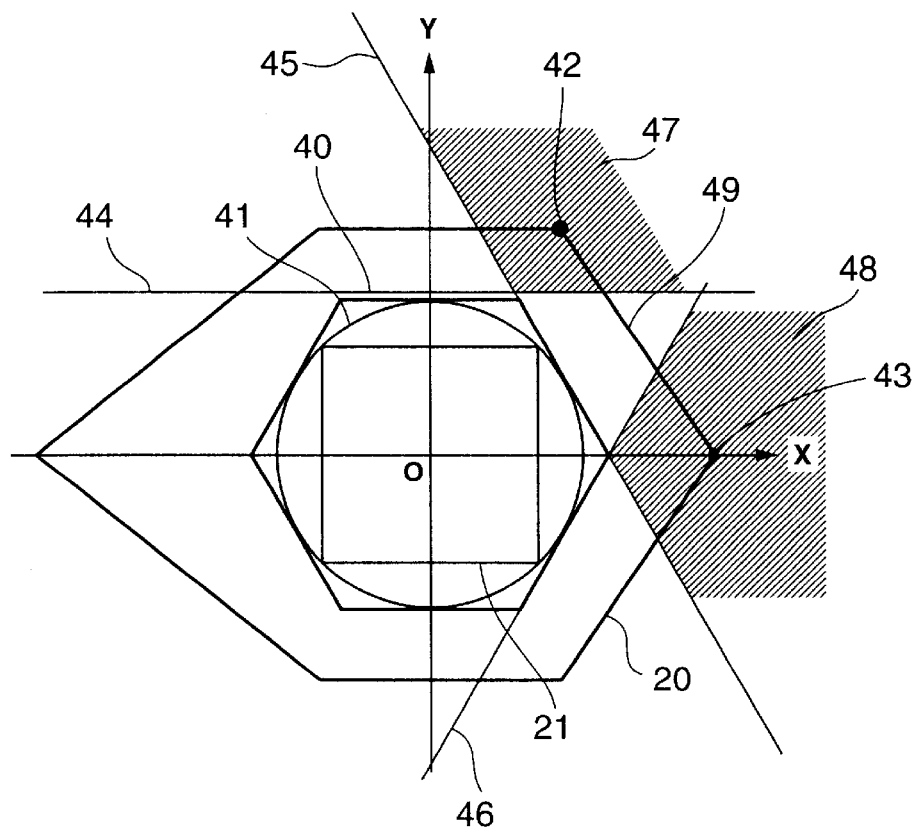
FIG. 4 is a diagram explaining how a movable area is decided in the first embodiment.
Figure 4B:
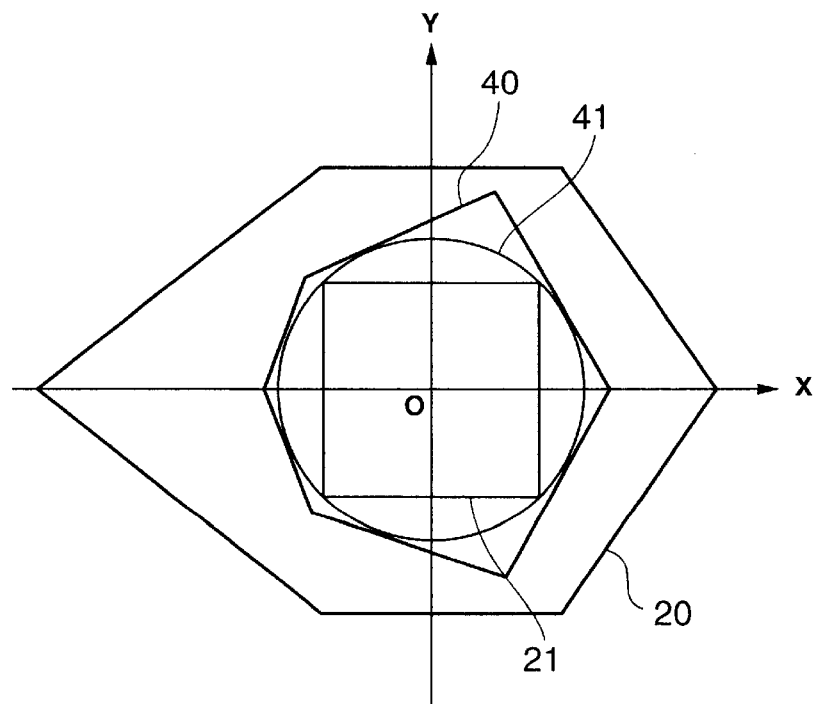

In FIG. 4, polygon 40 is a hexagon circumscribed by circumcircle 41 of the exclusive object. The number of angles of polygon 40, at the largest number, is the same number of the vertexes of the judging polygon included in such plane 30. In FIG. 4, polygon 40 is hexagonal because the number of the vertexes included here is 6. Polygon 40 can be a regular polygon as FIG. 4(a) or an irregular polygon as (b). The form of polygon 40 closely relates to the form of the judging object after the coordinate modification. This is because the form of polygon 40 corresponds to the form of judging object at its smallest size.

The movable area for every judging polygon is regulated by the 2 straight lines which are the extensions of the 2 arbitrary adjacent sides of such polygon 40. For example, the movable area of vertex 42 of the judging polygon is regulated by lines 44 and 45 and the movable area of vertex 43 is regulated by lines 45 and 46.

Shortly, the movable area for vertex 42 is, among 4 areas divided by straight lines 44 and 45, area 47 facing the area including exclusive object 21. And the movable area for vertex 43 is among 4 areas divided by straight lines 45 and 46, area 48 facing area 49 including exclusive object 21.

As long as vertex 42 is included in movable area 47 and vertex 43 is included in movable area 48, judging polygon 49 having vertexes 42 and 43 is always positioned opposite to exclusive object 21 with straight line 45 therebetween. This means there is no intersection of judging polygon 49 with the exclusive polygon.

Such movable area can be represented by an inequality of the 2 straight lines. Therefore, positioning condition memorizing means 10 memorizes each movable area by memorizing the information (large or small) of the coefficients (the inclinations and the intercepts) and the inequality of the 2 straight lines regulating each movable areas.

Polygon position amending means 11 reads out the movable area corresponding to every such vertex coordinates, i.e. the information of the coefficients and the inequality of the 2 straight lines, by inputting the vertex coordinates of the judging polygon and referring to such positioning condition memorizing means 10. Then it judges whether such vertex coordinates are inside such movable areas, i.e. whether they satisfy the inequalities.

For example, if the coordinates of the vertex a is represented by (p, q) and the movable area corresponding to the vertex a is represented by the 2 inequalities, $y \geq ax+b$ and $y \leq =cx+d$. In this case, when (p, q) satisfies the relation between the $q \geq ap+b$ and $q \leq cp+d$, the vertex a is judged that it is inside the movable area.

The vertex coordinates of the input judging polygon, if it is not the coordinate value of the coordinate system setting its original inside exclusive object 21, judges such condition after conversing the coordinates. For example, if the vertex coordinates is the coordinate value on the coordinates setting its original inside judging object 20, such vertex coordinates should be converted to an absolute coordinate system and then to a coordinate system setting its original inside the exclusive object.

If polygon position amending means 11 judges that the vertex coordinate is inside the movable area, it outputs the input coordinate directly without amending such vertex.

Figure 5:
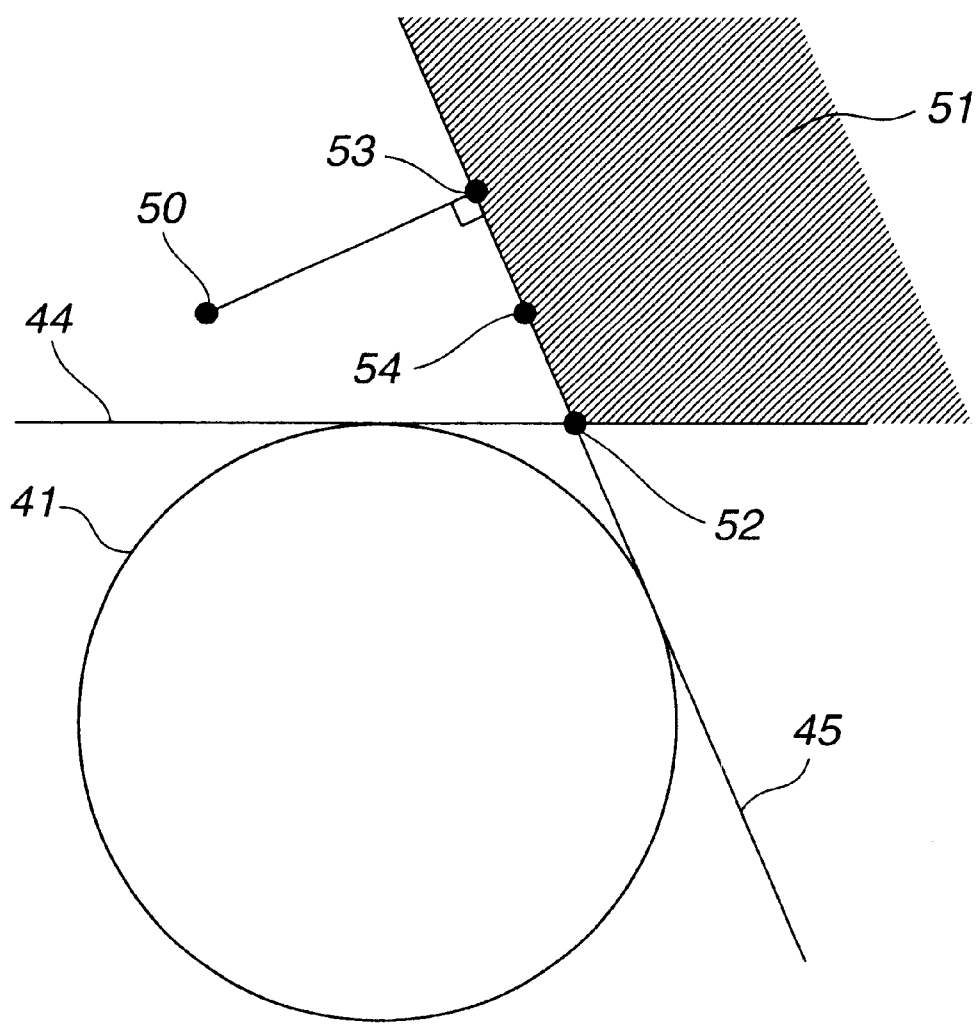
FIG. 5 is a diagram explaining the amending method of vertex coordinates in the first embodiment.

If polygon position amending means 11 judges that the vertex is not inside the movable area, it amends the coordinates so that the vertex is inside the movable area, and then outputs the amended coordinates. An example of the amending method is hereinafter explained referring to FIG. 5. In FIG. 5, point 50 is the vertex coordinates before amendment and area 51 is the movable area corresponding to such vertex.

For example, it is possible to amend vertex 50 with intersecting point 52 of the 2 straight lines regulating movable area 51. In this case, if positioning condition memorizing means 10 memorizes, from the first place, the coordinates of the intersecting point as well as the movable area, there is no need to calculate the coordinates on every amendment and so it permits a prompt amendment.

In another example, it is possible to amend vertex 50 with point 53 on the straight line regulating movable area 51. Point 53 is the closest point to vertex 50 inside movable area 51. In this case, the amount of movement volume of the vertex due to the amendment is smallest, and so the influence of amendment can be controlled.

In another example, it is possible to amend vertex 50 with point 54 on the straight line regulating movable area 51. Point 54 is the point included in movable area 51, on which point vertex 50 and the x coordinates or y coordinates are equal.

Second Example of First Embodiment

The second example of the first embodiment will be hereinafter explained. In the second example, just as the first example, a judging object is regarded as an object which is permitted transformation and an exclusive object is regarded as a form-fixed object which is permitted no transformation.

Positioning condition memorizing means 10 is similar to the first example in that it memorizes a movable area for every vertex of a judging polygon, however, it differs from it in that such movable area is circular. The method for deciding such movable area will be hereinafter explained.

Figure 6:
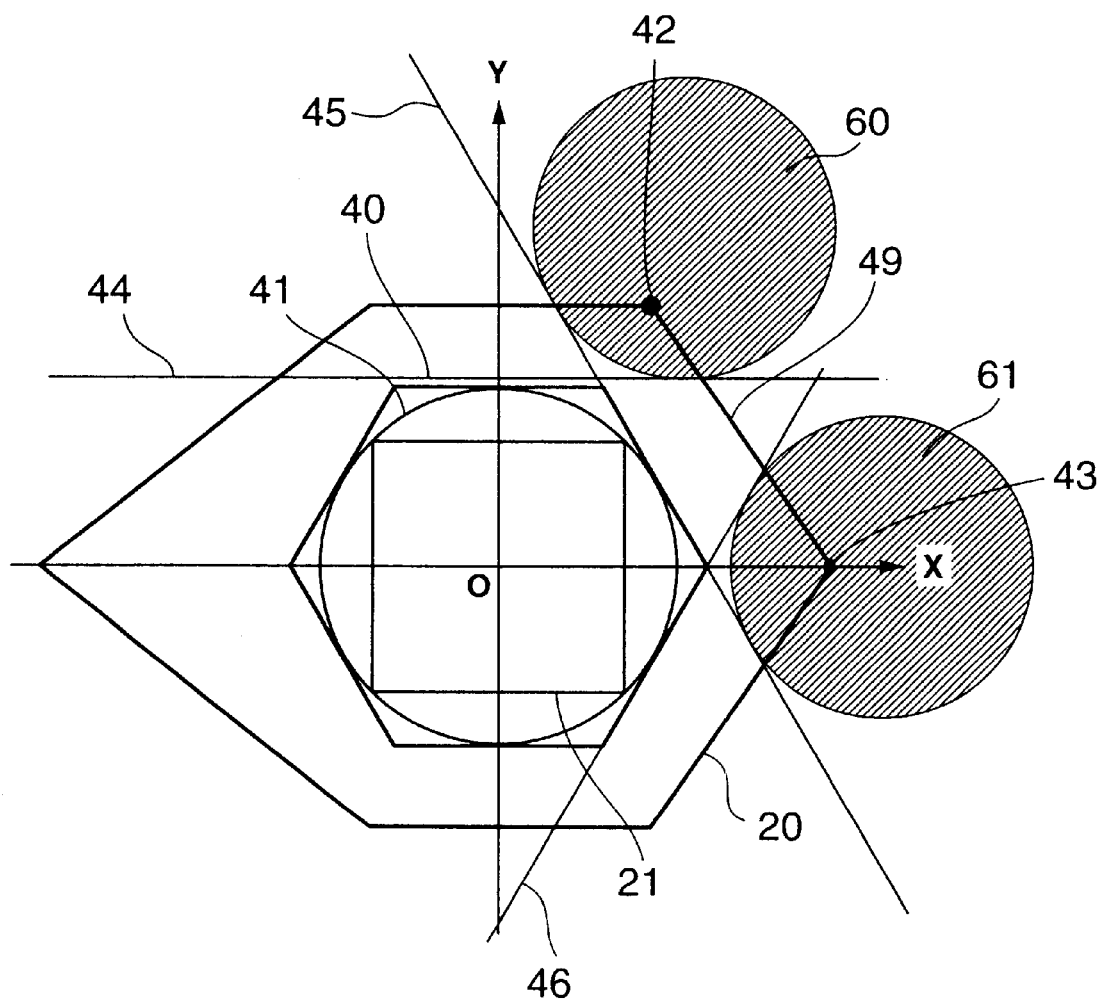
FIG. 6 is a diagram explaining the setting method of a movable area in the second embodiment.

In FIG. 6, polygon 40 is a hexagon circumscribed by circumcircle 41 of the exclusive object. The numbers of angles of polygon 40 equals to the number of the vertexes of the judging polygon included in plane 30, and polygon 40 is hexagonal in the diagram because the number of its vertexes is 6. The movable area of each judging polygon is regulated as a circle contacting the 2 straight lines which are the extensions of the 2 arbitrary adjacent sides of such polygon 40. Such circle contacts the 2 straight lines from the opposite sides of circumcircle 41 of the exclusive object. For example, the movable area for vertex 42 of the judging polygon is circle 60 contacting lines 44 and 45, and the movable area for vertex 43 of the judging polygon is circle 61 contacting lines 45 and 46.

As long as vertex 42 is included in movable area 60 and vertex 43 is included in movable area 61, judging polygon 49 having vertex 42 and 43 is always positioned opposite of exclusive object 21 with straight line 45 therebetween. This means there is no intersection of judging polygon 49 with the exclusive polygon.

Because such movable areas can be represented by the inequalities, positioning condition memorizing means 10 memorizes each movable area by memorizing information (large or small) of the coefficients (center and radius) and the inequalities of the circles regulating each movable area.

Polygon position amending means 11 reads out the movable area corresponding to every such vertex coordinates, i.e. the information of the coefficients and the inequalities of the circle, by inputting the vertex coordinates of the judging polygon and referring to such positioning condition memorizing means.

For example, if the coordinates of the vertex a is represented by (p, q) and the movable area corresponding the vertex a is represented by the inequality; $r^2 \geq ax^2+by^2$. In this case, if (p, q) satisfies the relation of $r^2 \geq ap^2+bq^2$, the vetex a is judged that it is inside the movable area.

If the vertex coordinates of the input judging polygon is not the coordinate value on the coordinate system setting its original inside exclusive object 21, the judgement of such condition is conducted after converting the coordinates. For example, if the vertex coordinates is the coordinate value on the coordinate system setting its original inside judging object 20, such vertex coordinates should be converted to an absolute coordinate system and then to the coordinate system setting its original inside the exclusive object.

If judged that the vertex coordinates are inside the movable area, the input coordinates are directly output without amending such vertex.

Figure 7:
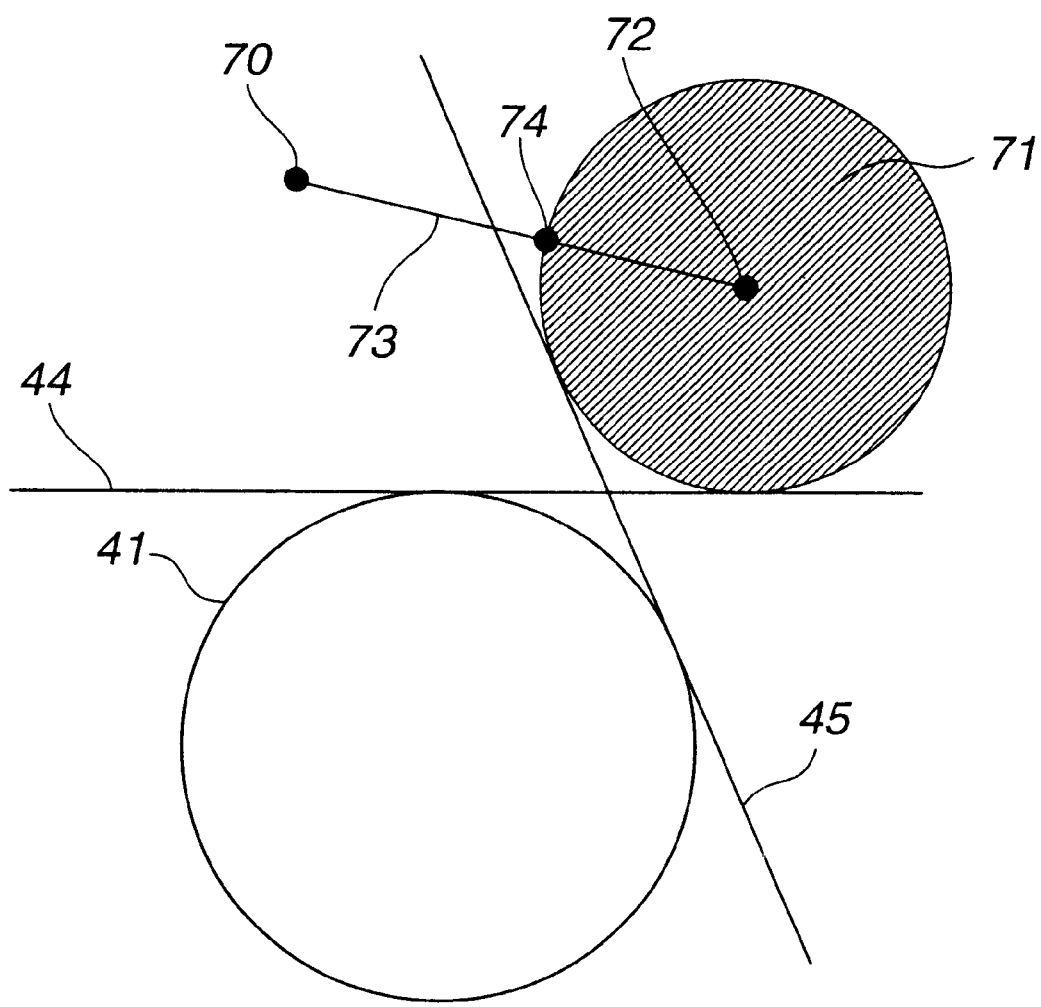
FIG. 7 is a diagram explaining the amending method of vertex coordinates in the second embodiment.

If it is judged that the vertex coordinates are not inside the movable area, the coordinates should be amended such that the vertexes are included in the movable area and the coordinates are output after the amendment. An amending method will be hereinafter explained referring to FIG. 7. In FIG. 7, point 70 is the vertex coordinates before amendment, area 71 is the movable area corresponding to such vertex, and point 72 is the center point of the movable area.

For example, it is possible to amend vertex 70 with point 72. In this method, if it is arranged beforehand that positioning condition memorizing means 10 memorizes the coordinates of the center point as well as the movable area, there is no need to calculate the coordinates and a prompt amendment is permitted.

For example, it is possible to amend vertex 70 with intersecting point 74. Such intersecting point 74 corresponds to the intersecting point of given straight line 73 linking vertex 70 and center point 72, and the external circuit of movable area 71. Intersecting point 74 is the closest point to vertex 70 inside movable area 71, therefore, the amount of movement of the vertex due to the amendment becomes smallest and the influence from the amendment can be controlled.

Figure 8:
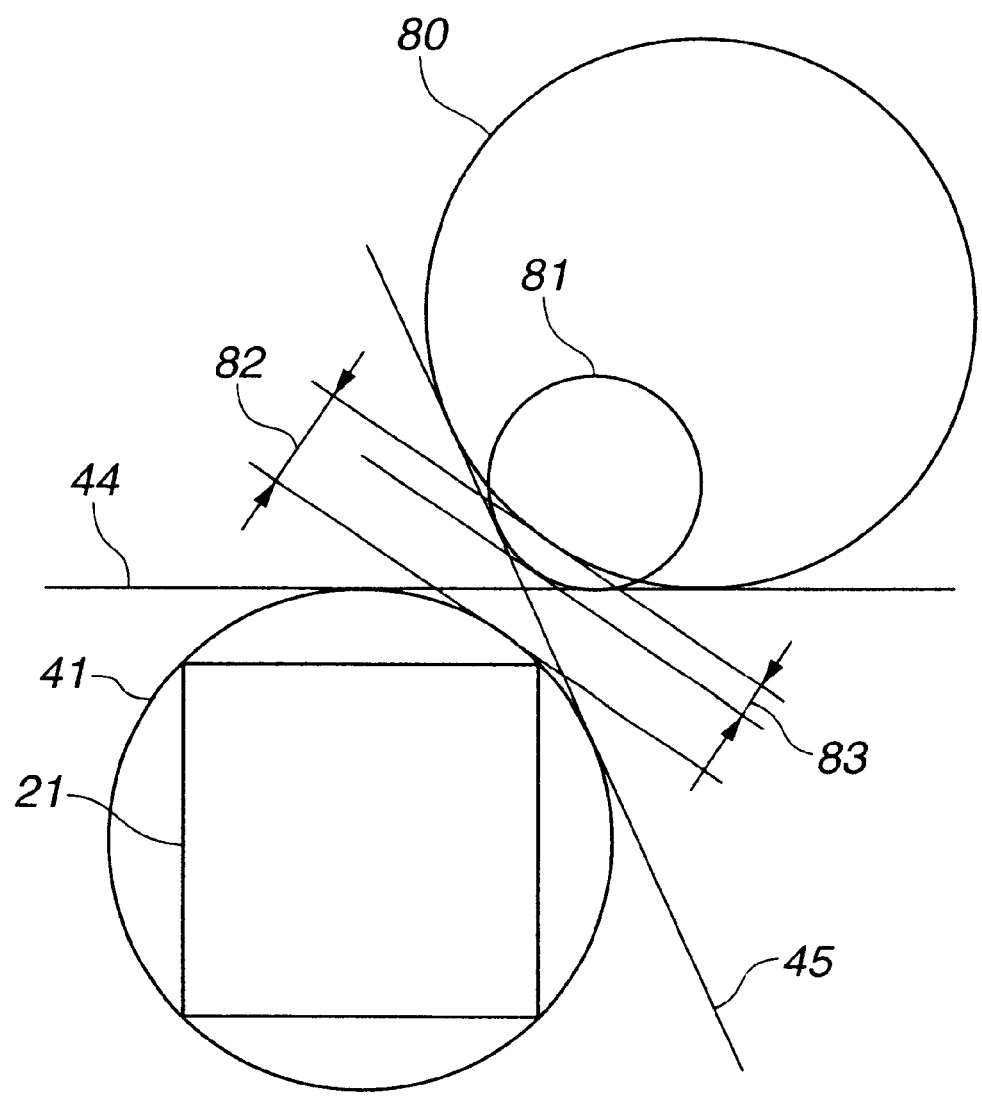
FIG. 8 is a diagram showing the relation of the distance between a movable area and an exclusive object.

In this example, the size of the circle of the movable area is closely related to the flexibility regarding the position of each vertex of the judging polygon. For example, such as circle 80 in FIG. 8, enlarging the size of the circle broadens the area for the existence of the vertex, but distance 82 between circle 80 and exclusive object 21 becomes wider. On the other hand, as circle 81 in FIG. 8, reducing the size of the circle limits the area for the existence of the vertex but distance 83 between circle 80 and exclusive object 21 becomes smaller. It is desired that the size of the circle is fixed based on the modeling information, for example, what a judging object and an exclusive object model on.

Figure 9A:
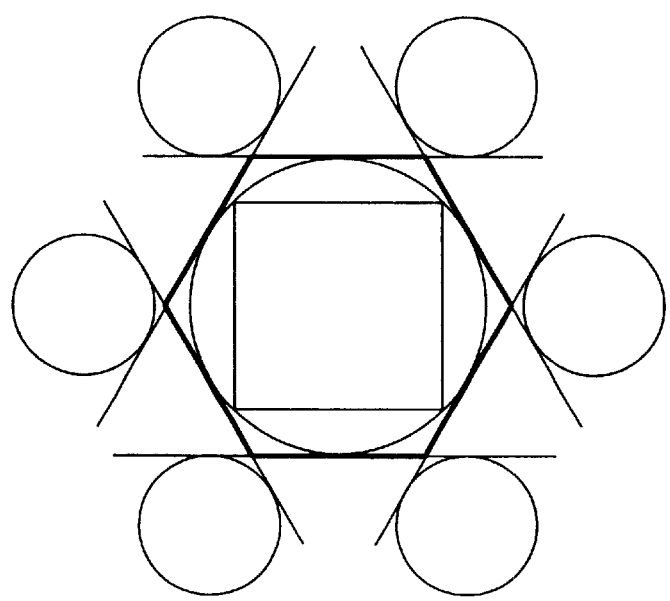
FIG. 9 is a diagram explaining the variations of movable areas.
Figure 9B:
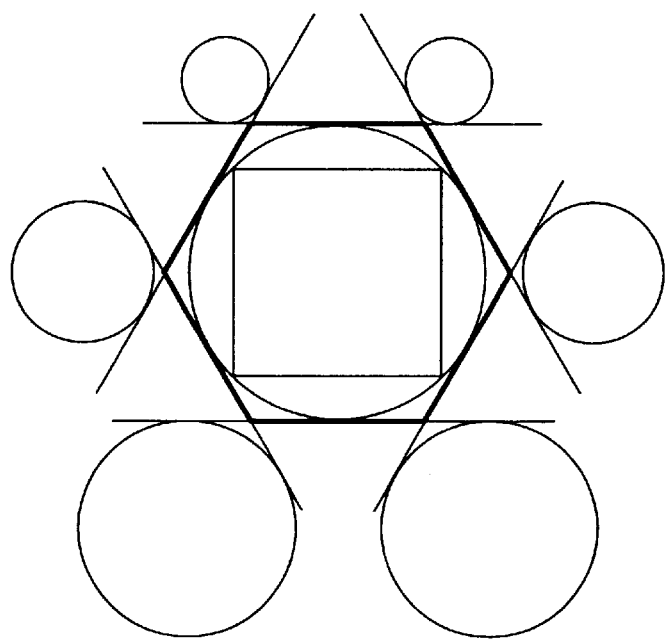

The form of a judging object closely relates to whether a judging polygon has a movable area of the equal size or of a different size for its each vertex. When the sizes of the circles of movable areas are equalized (refer to FIG. 9($a$)), flexibility regarding the positions of the vertexes of the judging polygon becomes equal, therefore, the form of the judging object after the coordinate amendment is in balance. On the other hand, when the sizes of the circles of movable areas are different for each vertex (refer to FIG. 9($b$)), a vertex with a small movable area gives the impression that it sticks to an exclusive object, and a vertex with a large movable area gives the impression that it has less adherence to the exclusive object.

Third Example of the First Embodiment

The third example of the first embodiment will be hereinafter explained. In the third example, just as the second example, a judging object is regarded as an object which is permitted transformation and an exclusive object is regarded as a fixed-form object which is permitted no transformation.

Positioning condition memorizing means 10 is similar to the one in the second example in that it memorizes the circular movable area for each vertex of a judging polygon, but different from it in that the number of angles of polygon 40 is smaller than the number of vertexes of the judging polygon included in plane 30.

Figure 10A:
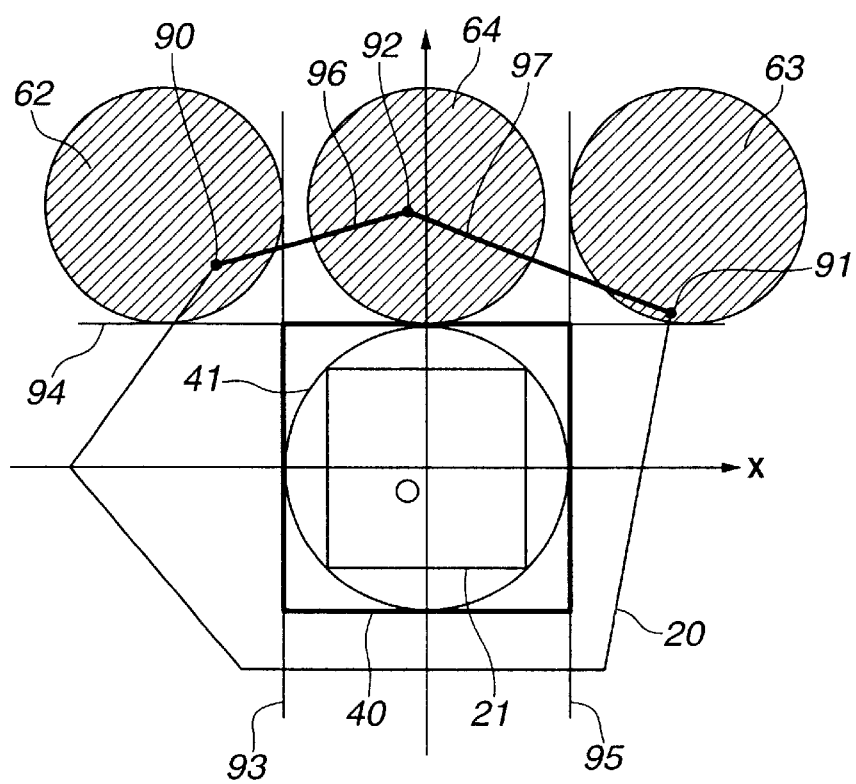
FIG. 10 is a diagram explaining the setting method a movable area in the third embodiment.
Figure 10B:
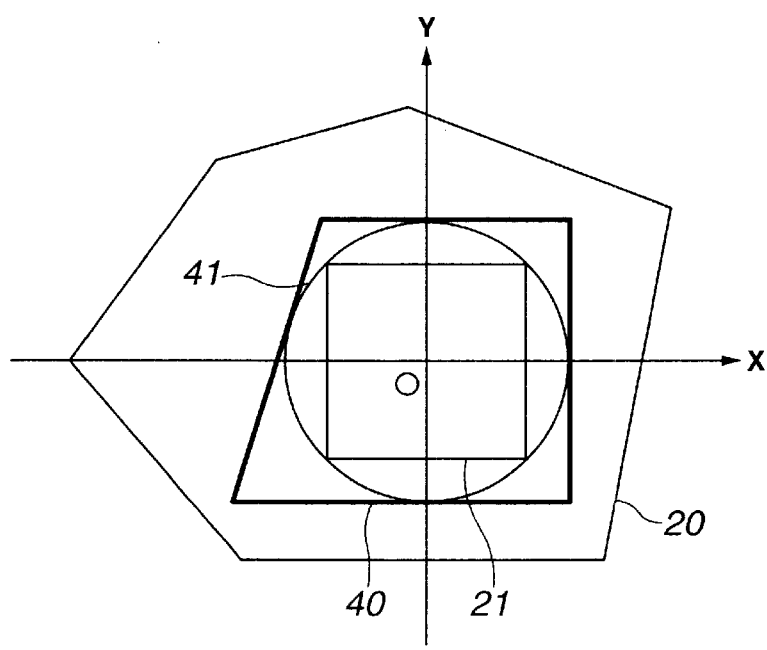

In FIG. 10, polygon 40 is a square circumscribed by circumcircle 41 of an exclusive object. The number of angles of polygon 40 is 4, smaller than 6, the number of vertexes of the judging polygon included in plane 30. Polygon 40 can be a regular polygon as shown in FIG. 10($a$) or an irregular polygon as shown in ($b$).

Regarding the vertexes of the number of angles of polygon 40 (4 in this example), the movable area of each vertex of a judging polygon is regulated as a circle contacting 2 straight lines which are the extensions of 2 arbitrary adjacent sides of polygon 40. Such circle contacts the 2 straight lines from the opposite side of circumcircle 41 of the exclusive object. For example, the movable area for vertex 90 of the judging polygon is circle 62 contacting lines 93 and 94, and the movable area for vertex 91 is circle 63 contacting lines 94 and 95.

The rest of the vertexes of the judging polygon are regulated as the circles contacting a straight line which is an extension of the side of polygon 40. Such circle contacts the straight line from the opposite side of circumcircle 41 of the exclusive object. For example, circle 64 contacting straight line 94 is the movable area for vertex 92 of the judging polygon.

Movable area 64, compared to movable areas 62 and 63, can be established closer to exclusive object 21, therefore, flexibility of vertex 92 for exclusive object 21 becomes higher and representation of dynamic movements can be achieved.

As long as vertex 90, 91 and 92 are respectively included inside movable area 62, 63 and 64, judging polygon 96 having vertexes 90 and 92 and judging polygon 97 having vertexes 92 and 91 are always positioned opposite of exclusive object 21 with straight line 94 therebetween. This means there is no intersection of judging polygons 96 and 97 with an exclusive polygon.

Such movable areas can be represented by inequalities, therefore, positioning condition memorizing means 10 memorizes each movable area by memorizing the information (large or small) of the coefficient (center and radius) and the inequalities of the circle regulating each movable area.

The constitution and the operation of polygon position amending means 11 are the same in the second example. In short, polygon position amending means 11 reads out movable areas corresponding to each vertex coordinates, i.e. the information of the coefficient and the inequality of the circle, by inputting the vertex coordinates of the judging polygon and referring to such positioning condition memorizing means. And it judges whether the vertex coordinates is inside the movable areas, i.e. whether the vertex coordinates satisfy the inequalities.

Modified Examples

Without limitation to the above examples, it is possible to apply the present invention in various forms. For example, polygon position amending means 11 can transform a movable area which it already read and judge whether the vertex coordinates after the transformation are inside the movable area. This permits changing the form of the movable area according to the form of the exclusive object transformed by the movement, when the exclusive object is permitted transformation. When the movable area is regulated by 2 straight lines, it can be transformed by changing the inclination and intercept of the straight lines, and when the movable area is regulated as a circle, it can be transformed by changing the radius and the center of the circle. In this example, a judging object is regarded as an object representing clothes and an exclusive object is regarded as an object representing a body, however, the object intended in the present invention is not limited to the above examples. Objects can be anything as long as they are established not to intersect each other under the rules in the virtual space.

Second Embodiment

Figure 11:
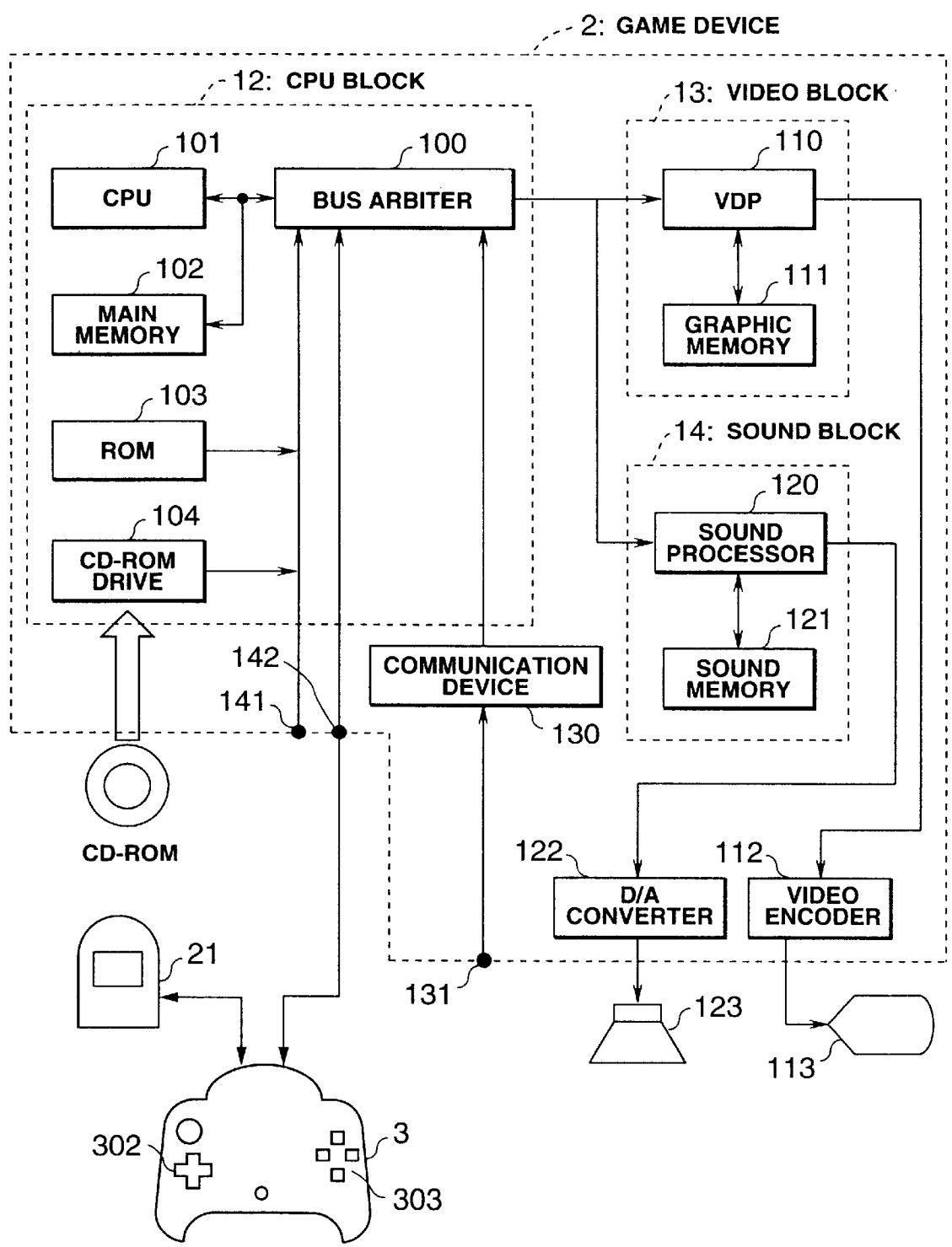
FIG. 11 is a block diagram showing the constitution of the second embodiment according to the present invention.

The second embodiment of the present invention will be hereinafter explained referring to FIG. 11. Game device 2 of the second embodiment according to the present invention is comprising CPU block 12, video block 13, and sound block 14.

CPU block 12 is comprising bus arbiter 100, CPU 101, main memory 102, ROM 103, and CD-ROM drive 104. Bus arbiter 100 is able to control the sending/receiving of data by allotting the bus occupying hours to the devices connected to each other via buses. CPU 101 is able to access backup memory 301 via main memory 102, ROM 103, CD-ROM drive 104, video block 13, sound block 14, and controller 3. CPU 101 implements the initial program (initial implement program) housed in ROM 103 at the time of power application, initializes the whole device. And when it detects that the CD-ROM is set inside the CD-ROM drive 104, it transfers to main memory 102 the program data housed in the CD-ROM for operating the system. Later, CPU 101 operates in accordance with the operating system, and it continuously transfers to main memory 102 and implements the game program of the present invention housed in the CD-ROM. Furthermore, CPU 101 is able to transfer the image data for game processing to graphic memory 111 and the sound data to sound memory 121. The program processing implemented by CPU 101 is inputting operating signals from controller 3 and the communication data from communicating device 130, controlling the image output implemented by video block 13, and controlling the voice output implemented by sound block 14. Main memory 102 mainly houses the program data and the program for the above operating system, and is able to provide working areas for housing the static variables and the dynamic variables. ROM 103 is the housing area for the initial program loader. CD-ROM drive 104 can be freely equipped with CD-ROM, and when the CD-ROM is equipped, CD-ROM drive 104 is able to output such data to CPU 101 and transfer the data by the control of CPU 101. The CD-ROM is housing the game program of the present invention, the image data for displaying images, and the sound data for outputting sound. Recording media is not limited to a CD-ROM, so other recording medium of various kinds can be made readable. Or, the group of data housed in the CD-ROM can be transferred to each memory via communication device 130. This permits transferring data from the fixed disc at the distant server.

Video block 13 is comprising VDP (Video Display Processor) 110, graphic memory 111 and video encoder 112. Graphic memory 111 is housing the image data read out from the CD-ROM as explained above. VDP 110 is able to read out, from the image data housed in graphic memory 111, the image data necessary for displaying images, and implement coordinate transformation (geometry arithmetic), texture mapping processing, display priority processing, and shading processing in accordance with the necessary information for the image display provided by CPU 101; the command data, view positioning data, illumination positioning data, object designing data, object positioning data, polygon coordinate data, texture designing data, texture density data, and view conversion matrix data. It is possible to arrange that CPU 101 implements the processing of the above coordinate conversion. Shortly, each device should be allotted a processing according to each calculated arithmetic capability. Video encoder 112 is able to convert the image data produced by VDP 110 to a certain television signal such as the NTSC method etc. and input such signal to main monitor 113 connected to the outside.

Sound block 14 is comprising sound processor 120, sound memory 121 and D/A converter 122. Sound memory 121 is housing the sound data read out from the CD-ROM as mentioned before. Sound processor 120 reads out the sound data such as the wavy data housed in sound memory 121 in accordance with the command data provided by CPU 101, and implements the various kinds of effect processing and the digital/analog conversion processing based on the DSP (Digital Signal Processor) function. D/A converter 122 is able to convert the sound data produced by sound processor 120 to the analog signal and output the signal to speaker 123 connected to the outside.

Communication device 130, for example a modem and a terminal adapter, can be connected to game device 2 and is able to function as an adapter connecting game device 2 and the external line. Communication device 130 is able to receive the data sent from the game providing server connected to a public line network, and provide the data to the bus of CPU block 12. A public line is not limited to a local loop, leased line, wire, or wireless.

Controller 3 is able to convert regularly the operating condition of operation button group 302 and cross keys 303 to a code and send it to game body 2. Operation signals from each controller 3 are used for moving the characters displayed in the present game. Controller 3 is able to send/ receive from game body 2 the parameter specifying the situation of the game processing and the setting data of characters, and read out such data from backup memory 301 and writes it down. Backup memory 301 can be freely connected to controller 3 and also can be accessed by CPU 101. Backup memory 301 is the housing area for the setting data transferred from CPU 101, including the developing condition of the game, the game score, and the operation method occurring in the game. These setting data function as the backup data for restarting the game just before the power is shutdown, and they also function as the data for reflecting the operating condition of the other game devices directly to the present game device.

By implementing the game product of the present invention, CPU 101 arranges an object in the virtual space formed in the computer system, develops the game while controlling the motion of the object in accordance with input operation and regulated rules, and displays the situation inside the virtual space as an image through a virtual camera. By implementing the game product of the present invention, CPU 101 also has the same function as the image processing device does in the first embodiment.

CPU 101 memorizes in main memory 102, corresponding the vertexes of a polygon constituting a first object, the condition regarding the position corresponding a second object. Such condition is that there is no intersection of a polygon constituting the first object and a polygon constituting a second object.

As such condition, it can be suggested that, among 4 plane areas divided by 2 straight lines which are extensions of 2 arbitrary adjacent sides of a polygon circumscribing the circumcircle which is circumscribing the second object, the position corresponding the second object should be contained in a plane area facing another plane area containing such circumcircle.

Another condition can be considered that among 4 plane areas divided by 2 straight lines which are extensions of 2 arbitrary adjacent sides of a polygon circumscribing the circumcircle which is circumscribing the second object on the plane, the position corresponding the second object should be contained in a plane area facing another plane area containing such circumcircle, and that such area is a circular area contacting the 2 straight lines.

Figure 12:
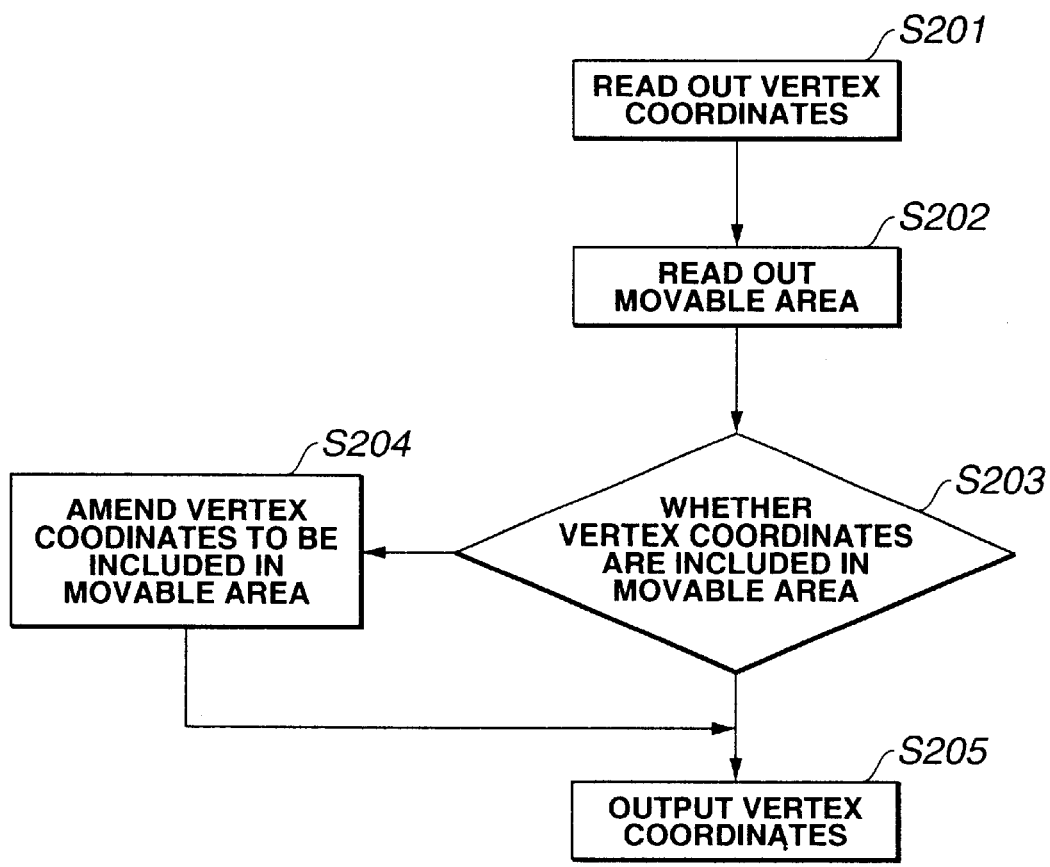
FIG. 12 is a flow chart showing the process of the present invention.
Figure 13:
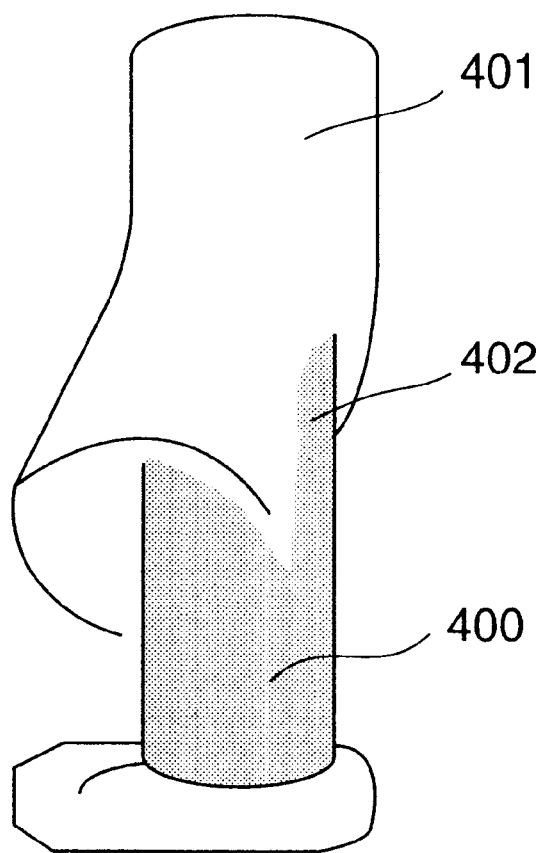
FIG. 13 is a typical diagram explaining the situation of an intersection of polygons.
Figure 14A:
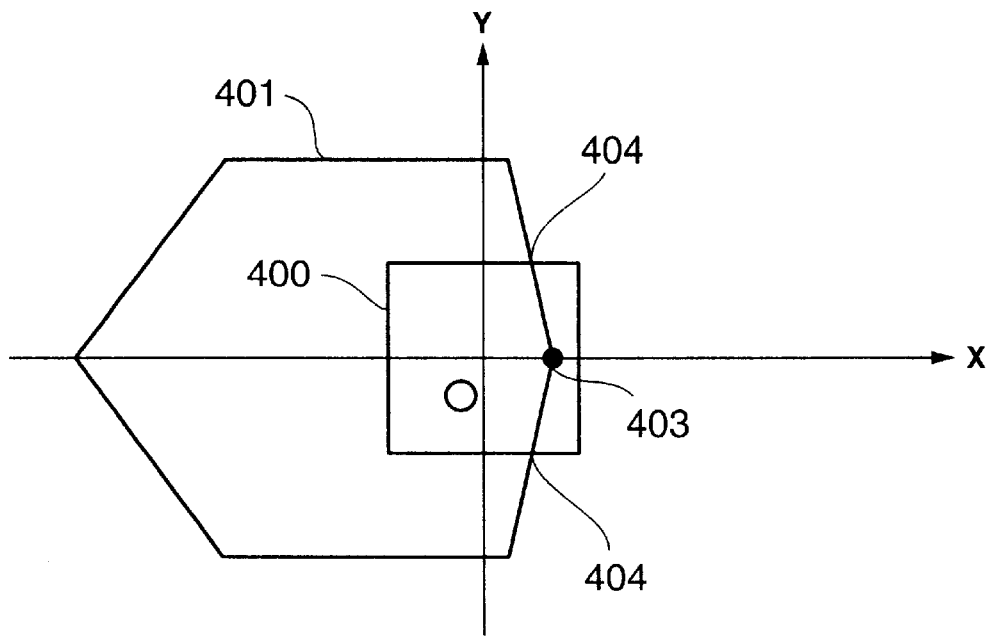
FIG. 14 is a diagram explaining the related art.
Figure 14B:
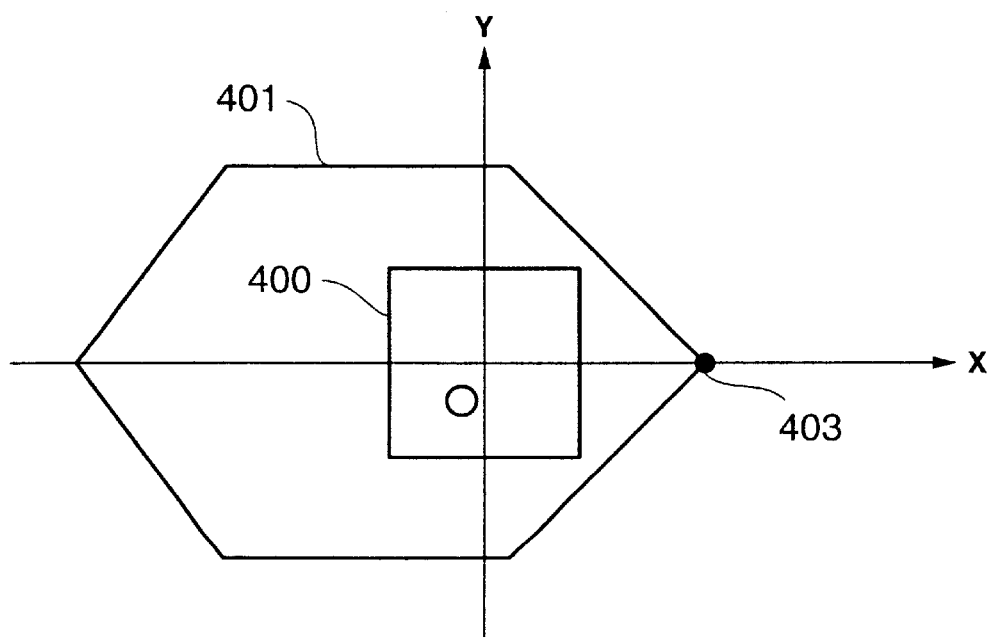
Figure 15:
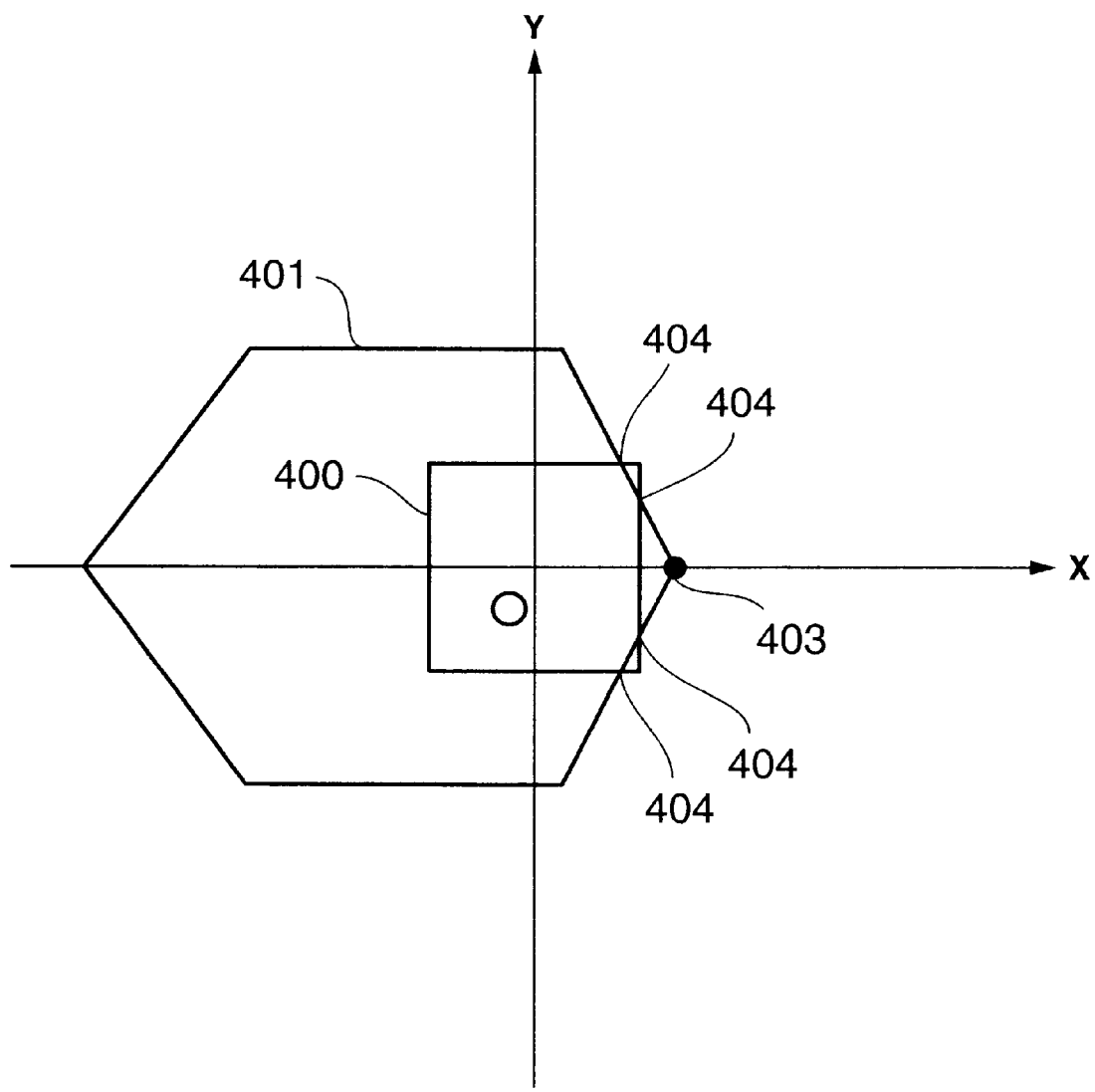
FIG. 15 is a diagram explaining the problem of the related art.

FIG. 12 shows a flow chart of the image processing implemented by CPU 101.

At step S 201, CPU 101 reads out, from main memory 102, the vertex coordinates of polygons constituting a first object, and conducts the coordinate conversion when the vertex coordinates is not the coordinate value in the coordinate system setting its original inside a second object. For example, if the vertex coordinates is the coordinate value in the coordinate system setting its original inside the first object, the vertex coordinates should be converted to absolute coordinates and then to a coordinate system setting its original inside the second object.

At step S 202, CPU 101 reads out, from main memory 102, a movable area corresponding to each vertex coordinates of the polygons constituting a first object. For example, if the movable area is regulated by 2 straight lines, CPU 101 reads out the information of the coefficient and the inequality of the 2 straight lines. Or if the movable area is regulated as a circle, CPU 101 reads out the information of the coefficient and the inequality of the circle.

At step S 203, CPU 101 judges whether the vertex coordinates is included in the movable read at step S 202, i.e. whether the vertex coordinates satisfy the inequality. If CPU 101 judges it is included in the movable area, it takes step S 206, but if it judges that it is not included, then it takes step S 205.

At step A 205, CPU 101 amends the coordinates such that the vertex coordinates is included in the movable area read at step S 202. The various methods explained in the fist embodiment can be used here as an amending method.

At step S 206, CPU 101 outputs the vertex coordinates to main memory 102.

Modified Examples

The present invention is not limited to the above embodiments but can be applied in the various forms. For example, the game device of the present invention includes both the game device for home and the device for an amusement facility. In the latter case, a controller with a group of operation buttons and so-called joystick can be used instead of controller 3 in the second embodiment.

Third Embodiment

The third embodiment according to the present invention will be hereinafter explained. In the third embodiment, a recording medium recorded an image processing program is provided. This recording medium can be a CD-ROM, a magnetic disc, a semiconductor memory or others, and it includes the case of retailing such medium through network.

The image processing program is read into the data processing device from the recording medium and it controls the operation of the data processing device. The data processing device memorizes, corresponding the vertexes of the polygons constituting a first object and by controlling the image processing program, the condition regarding the relative position corresponding a second object onto the recording medium, judges whether the vertexes of the polygon constituting the first object satisfy the condition, and, if it judges that the condition is not satisfied, amends the position of the vertexes so that they satisfy the condition. The condition is that there is no intersection of the polygon constituting a first object and the polygon constituting a second object.

Shortly, by controlling the game program, the data processing device implements the same processing as positioning condition memorizing means 10 and polygon position amending means 11 in FIG. 1.

Regarding the polygons constituting an object, the present invention prevents its intersection with other polygons constituting another object without increasing the number of polygons. Specifically, by preventing intersections with the polygons constituting the object established not to physically intersect, the present invention permits the compatible arrangement of objects in a virtual space.

The present invention permits the realistic and compatible representation of dynamic motions in a game by preventing intersections of polygons.

What is claimed is:

1. An image processing device configured to process corresponding vertexes of polygons constituting a first object, comprising:

a positioning condition memorizing means for memorizing conditions regarding a position corresponding a second object; and a polygon position amending means for judging whether each vertex of a polygon constituting said first object satisfies a corresponding condition by referring to said positioning condition memorizing means, and if it does not satisfy the corresponding condition, then amending the position of each vertex so that the corresponding condition is satisfied, wherein, said memorized conditions are that there is no intersection of polygons constituting said first object and polygons constituting said second object.

2. The image processing device according to claim 1, characterized in that said positioning condition memorizing means memorizes, as said condition, an area established relatively corresponding to said second object.

3. The image processing device according to claim 2, characterized in that said area is an area on a plane.

4. The image processing device according to claim 3, characterized in that said area is, among 4 plane areas divided by 2 straight lines which are extensions of 2 arbitrary adjacent sides of a polygon circumscribing the circumcircle which is circumscribing said second object on said plane, an area included in a plane area facing another plane area including said circumcircle.

5. The image processing device according to claim 4, characterized in that said area is a circular area contacting said 2 straight lines.

6. The image processing device according to claim 3, characterized in that said positioning condition memorizing means memorizes, as said area, at least a circular area contacting, from the opposite side of said circumcircle, 2 straight lines which are extensions of 2 arbitrary adjacent sides of a plane polygon circumscribing the circumcircle which is circumscribing said second object on said plane, and that it further memorizes a circular area contacting, from the opposite side of said circumcircle, a straight line extended from 1 optional side of said polygon.

7. The image processing device according to one of claims 2 to 6, characterized in that said polygon position amending means judges whether vertexes of polygons constituting said first object are included in said area, and, if it is not included in said area, then it amends said position of said vertexes so that they are included in said area.

8. The image processing device according to one of claims 1 to 6, characterized in that said first object is arranged to cover at least a part of said second object.

9. The image processing device according to one of claims 1 to 6, characterized in that said first object is an object representing a material a human is wearing and that said second object is an object representing a human body or a material a human is wearing.

10. A game device, characterized in that it is a game device for arranging an object in a virtual space produced in a computer system, developing a game while controlling motions of said object in accordance with input operation and regulated rules, and displaying the situation in said virtual space as an image seen through a virtual camera, and comprising the image processing device described in one of claims 1 to 6.

11. An image processing method for processing corresponding vertexes of polygons constituting a first object, comprising:

memorizing onto a recording means conditions regarding a position for a second object;

judging whether each vertex of polygons constituting said first object satisfy a corresponding condition, and, if each vertex is not included in an area defined by the corresponding condition, amending the position of each vertex so that the corresponding condition is satisfied, wherein, said memorized conditions are that there is no intersection of polygons constituting said first object and polygons constituting said second object.

12. The image processing method according to claim 11, characterized in that said condition is recorded as an area established as relative to said second object.

13. The image processing method according to claim 12, wherein said area is an area on a plane.

14. The image processing method according to claim 13, wherein said area is, among 4 plane areas divided by 2 straight lines which are extensions of 2 arbitrary adjacent sides of a polygon circumscribing the circumcircle which is circumscribing said second object on said plane, an area included in a plane area facing another area including said circumcircle.

15. The image processing method according to claim 14, wherein said area is a circular area contacting said 2 straight lines.

16. The image processing method according to claim 13 for memorizing, as said area, at least a circular area contacting, from the opposite side of said circumcircle, 2 straight lines which are extensions of 2 arbitrary adjacent sides of a polygon circumscribing the circumcircle which is circumscribing said second object on said plane, and further a circular area contacting, from the opposite side of said circumcircle, a straight line which is an extension of one arbitrary side of said polygon.

17. The image processing method according to one of claims 12 to 16, wherein judgment whether vertexes of polygons constituting said first object satisfy said condition depends on whether vertexes of polygons constituting said first object are included in said area, and, if it is judged that they are not included, the position of said vertexes are amended to be included.

18. The image processing method according to claims 11 to 16, wherein said first object is arranged to cover at least a part of said second object.

19. The image processing method according to claims 11 to 16, wherein said first object is an object representing a material a human is wearing and said second object is representing a human body or a material a human is wearing.

20. A game method, for arranging objects in a virtual space produced in a computer system, developing a game while controlling motions of said object in accordance with input operation and regulated rules, and displaying the situation in said virtual space as an image seen through an virtual camera, wherein, coordinates of polygons constituting said object is amended by the image processing method according to one of claims 11 to 16.

21. A computer readable recording medium, housing a program for implementing the image processing method according to one of claims 11 to 16 in a computer.

22. A computer readable recording medium, housing a program for implementing the game method according to claim 20 in a computer.

* * * * *

UNITED STATES PATENT AND TRADEMARK OFFICE
CERTIFICATE OF CORRECTION

PATENT NO.     : 6,556,215 B1
DATED          : April 29, 2003
INVENTOR(S)    : Norio Haga et al.

It is certified that error appears in the above-identified patent and that said Letters Patent is hereby corrected as shown below:

<u>Column 16,</u>
Lines 20-21, "an virtual" should read -- a virtual --.

Signed and Sealed this

Second Day of March, 2004

JON W. DUDAS
*Acting Director of the United States Patent and Trademark Office*